US008005726B1

United States Patent
Bao

(10) Patent No.: US 8,005,726 B1
(45) Date of Patent: Aug. 23, 2011

(54) METHOD AND SYSTEM FOR INTERACTIVE RATE PLAN RECOMMENDER

(75) Inventor: Yulin Bao, Plano, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1243 days.

(21) Appl. No.: 10/308,690

(22) Filed: Dec. 3, 2002

(51) Int. Cl.
*G06Q 30/00* (2006.01)
*H04M 15/00* (2006.01)

(52) U.S. Cl. .............. 705/27; 705/26; 705/35; 705/400; 379/121.04

(58) Field of Classification Search ............. 705/26, 705/27, 1, 35, 1.1, 7, 8, 9, 10, 11, 20, 22, 705/26.4–26.63, 26.64, 26.7, 26.8, 27.1, 705/27.2, 28–30, 400; 379/111, 112.01, 379/112.06, 114.1, 114.12, 114.13, 114.17, 379/121.02, 121.04, 140
See application file for complete search history.

(56) References Cited

U.S. PATENT DOCUMENTS

| | | | | |
|---|---|---|---|---|
| 6,496,831 B1 * | 12/2002 | Baulier et al. | ............... | 707/101 |
| 6,704,410 B1 * | 3/2004 | McFarlane et al. | ...... | 379/265.05 |
| 7,412,412 B2 * | 8/2008 | Buxton et al. | ................... | 705/35 |
| 2002/0120540 A1 * | 8/2002 | Kende et al. | ..................... | 705/35 |
| 2003/0069982 A1 * | 4/2003 | Harper et al. | ................. | 709/228 |
| 2005/0215232 A1 * | 9/2005 | Marsh et al. | .................. | 455/405 |
| 2005/0267847 A1 * | 12/2005 | Blechman | ........................ | 705/75 |
| 2007/0260540 A1 * | 11/2007 | Chau et al. | ...................... | 705/40 |
| 2009/0043798 A1 * | 2/2009 | Tan et al. | ...................... | 707/102 |

OTHER PUBLICATIONS

Heller, P J "Seling the Right Plan" 1998; pp. 1-4.*
"As the World Churns"; America's Network, v 100, n 19, p. 28; 1996; pp. 1-11.*

* cited by examiner

*Primary Examiner* — Igor Borissov

(57) ABSTRACT

A method and system for analyzing rate plans for communication services may include obtaining usage data for a user from a database of historical usage data for the user and determining rate plan costs based on the usage data. The method and system may include obtaining information from a user and determining, based on the user information, if usage data for the communication services may be available for the user and obtaining the usage data from inputs by the user, including uploads of electronic bills, when the usage data is not available from the database. The method may be implemented on a web-based site server, which can connect to a decision engine for analyzing the usage data and determining the costs for the rate plan. The decision engine may access the historical usage database through one or more Application Program Interfaces operating on one or more billing servers.

13 Claims, 2 Drawing Sheets

METHOD AND SYSTEM FOR INTERACTIVE RATE PLAN RECOMMENDER

RELATED APPLICATIONS

There are no related applications.

FIELD OF THE INVENTION

The methods and systems relate to interactive tools, and more particularly to a method and system for interactively recommending rate plans for services based on usage patterns for the services.

BACKGROUND INFORMATION

Deregulation of the phone industry and the consequent proliferation of service providers offering a vast array of service or rate plans may have led to intense competition in providing phone services. While creating more choices for the consumer, the large number of plans available, with their unique rate structures, may make it more difficult, and at times nearly impossible, for the consumer to determine which plan would best serve his or her needs. Additionally, bundling of services, such as long distance, local calling, cellular, cable and internet access services, may make the choice of service provider and the service plan offered by the provider that much more confusing for the consumer.

To aid consumers in making such choices, consumers may contact a service provider to obtain service plan information, such as rate structures, and may typically obtain comparisons of a service provider's plans with the consumer's current plan. However, the costs of the various plans may be sensitive to the total usage and the pattern of usage that the consumer may exhibit. Without such usage information, a consumer may not be able to determine how much the individual plans may costs. Also, contacting the many different providers may be time consuming and the consumer may not know which rate plan to seek information about or which plans can be realistically compared based on the consumer's needs.

Additionally, some service providers, vendors and consumer assistance groups may provide interactive web sites, or tools, that assist the consumer in choosing or comparing rate plans. Since such tools may not use actual historical billing data or usage patterns, the consumer may input usage information, typically by responding to questions from the tool, and the tool may return a recommended plan showing the rates or costs of the plan based on the input usage information. The tools may also show alternative plans and may list a comparison of plans. However, these tools may generally offer comparisons for a single service, such as long distance or cellular service, and may provide comparisons with a limited number of plans.

Since the usage information that the consumer may have input may be based on the consumer's estimates of usage and not on real-time, or actual usage information, it may be difficult to convince the consumer that the comparisons are valid. Also, if the consumer wishes to order one of the plans, the sites may not provide the links required for the consumer to place the order, or, if a link may be provided, consumer or plan information may not be carried from one site to the other.

SUMMARY OF THE INVENTION

A method of analyzing rate plans for communication services can comprise obtaining user input data from a user of the method and determining if an historical usage database may be available for the user based on the user input data. The method can then access the historical usage database to obtain usage data from the historical usage database. When the historical usage database may not be available, the method can obtain additional data to access a usage database for the user so as to obtain the usage data. The method can derive a usage pattern for the user from the usage data and can determine rate plan costs for the communication services based on the usage pattern. The additional data can be access data, such as codes and/or passwords to access the usage database for the user, or may be an upload of usage data from the user into the usage database.

The method can determine the rate plan costs by applying rate structures contained in a rate plan database to the usage pattern. The method can access the historical usage database and the usage database for the user by accessing a first server to execute at least one application program interface to communicate with a second server for extracting the usage data from the database. If the usage data may not be extractable from the database, or if the additional data may not be available, the method can obtain estimates of usage data from the user, or the user may provide a facsimile transmission of usage data that can used by the method.

In one embodiment, a computer-readable medium can contain instructions for controlling a web-based site server to analyze rate plans for communication services by controlling the site server to obtain user input data from a user of the method, controlling the site server to determine, based on the user input data, if an historical usage database may be available for the user, controlling the site server to access the historical usage database to obtain usage data from the historical usage database when the historical usage database is available, controlling the site server to determine if additional data is available to access a usage database for the user to obtain the usage data when the historical usage database is not available, controlling the site server to access the usage database to obtain the usage data when the additional data is available, controlling the site server to obtain at least one of estimates of usage data from the user and a facsimile transmission of usage data from the user when the additional data is not available, controlling the site server to derive a usage pattern for the user from the usage data and controlling the site server to determine rate plan costs for the communication services based on the usage pattern.

The computer-readable medium may contain instructions for controlling the web-based site server to determine rate plan costs by applying rate structures contained in a rate plan database to the usage pattern. The computer-readable medium may also contain instructions for controlling the web-based site server to execute at least one application program interface to communicate with a database server to access the historical usage database or the usage database.

In one embodiment, a system for analyzing rate plans for communication services may comprise a web-based site server, a database of rate structures for the rate plans and a decision engine connected to the web-based site server for obtaining usage data from a database of usage data and determining rate plan costs for the communication services by applying the rate structures to a usage pattern derived from the usage data. The system can comprise application program interfaces that can facilitate communication between the decision engine and database servers that may extract the usage data from the database of usage data.

BRIEF DESCRIPTION OF THE DRAWINGS

The following figures may depict certain illustrative embodiments. The depicted embodiments can be understood as illustrative and not as limiting in any way.

DETAILED DESCRIPTION

Figure 1:
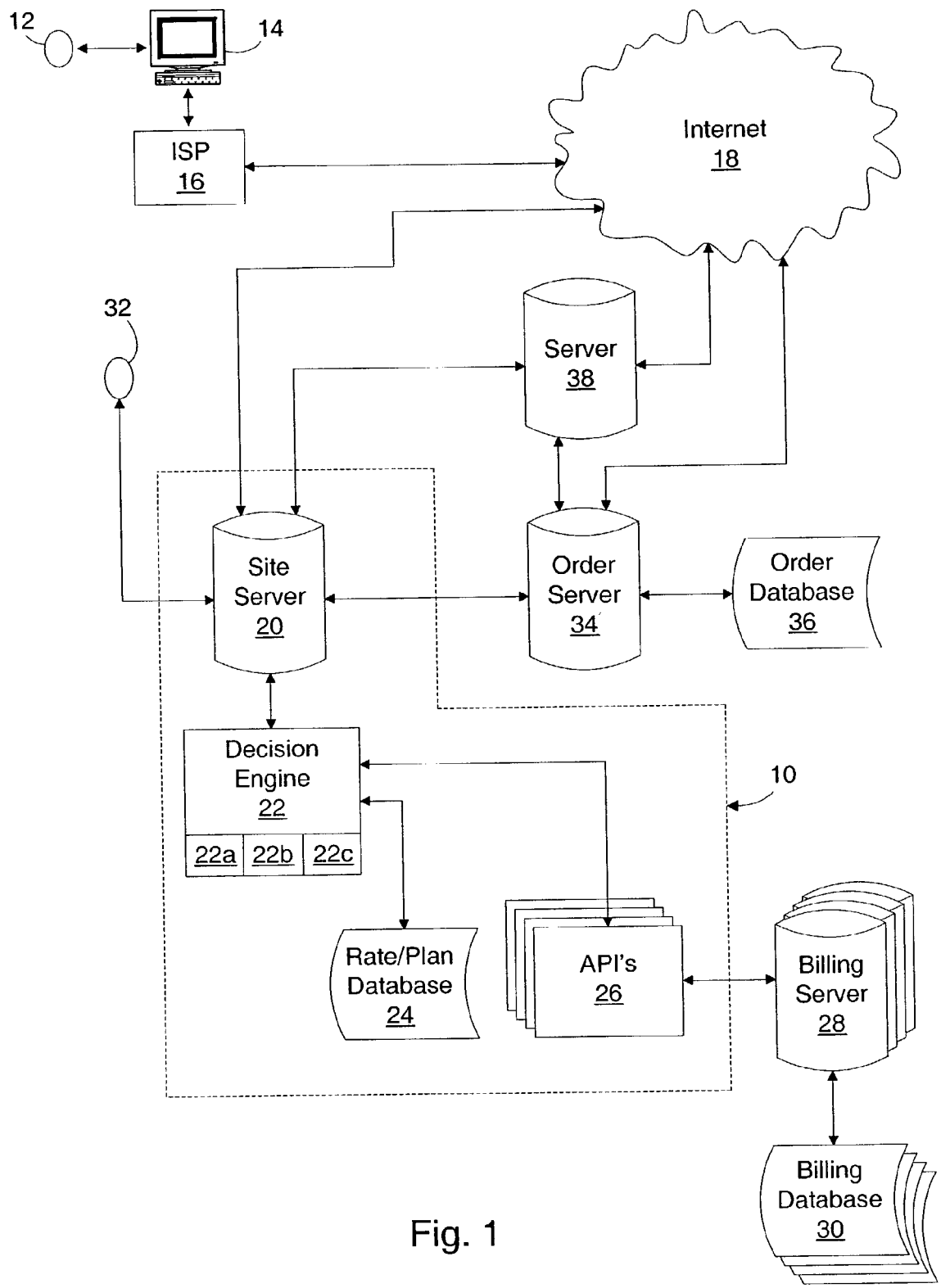
FIG. 1 shows a block diagram of a rate/plan recommender tool.

Referring now to FIG. 1, there can be shown a block diagram of a web-based system, or rate/plan recommender tool 10 that can provide to a consumer, a quantitative analysis and comparison, as well as a recommendation of a rate plan for communications services that best fit the consumer's needs based on information provided by the consumer. A consumer 12 at an interface 14, such as a personal computer, a web-enabled personal digital assistant and the like, can be connected to an Internet Service Provider (ISP) 16 and thence to the Internet 18. The connection between interface 14, ISP 16 and Internet 18 can be made in various known ways, such as through telephone modems, cable modems, satellite modems, Digital Subscriber Lines (DSL), or through other wired or wireless facilities.

By specifying the appropriate Uniform Resource Locater (URL) address, such as by manual input, through a bookmark, by clicking on an icon presented by a browser, or by other means as may be known, the consumer 12 may access the site server 20 of the rate/plan recommender tool 10, also connected to Internet 18. Site server 20 may be an HTTP web server as may be known in the art. When accessed, the server 20 presents one or more web pages to the consumer 12 requesting the consumer 12 to input information regarding the consumer 12, the type, or types of service the consumer 12 may be interested in and usage information for the service(s). Server 20 may direct the obtained information to a decision engine 22 of rate/plan recommender 10.

Decision engine 22 may return a listing for display to the consumer 12 by server 20 of rate/plans for the service(s) specified by the consumer 12, showing the costs for the rate/plans based on the information provided. To prepare the listing, decision engine 22 may access a rate/plan database 24. Rate/plan database 24 may contain detailed rate information for the rate/plans that may be used in a comparison. Such rate information may be readily available from published rate structures for the various rate/plans and calculation of the cost of a rate/plan may be a simple application of the rate structure to the usage information provided by the consumer 12. As an example, a rate/plan may indicate per minute rates for in-state calls, state-to-state calls, international calls by country, day, night and/or weekend calls, as well as monthly fees, minimum fees, free minutes and/or other rate information by which a user may be charged for the particular rate/plan.

When available, and if so indicated by the consumer 12, the decision engine 22 may access current or historical usage data for the consumer 12 to prepare the listing. Such usage data may be available when the consumer 12, or a user, may be a customer of a service provider that may be hosting the site where tool 10 may be located. Usage data may also be available when the consumer 12 may permit the host of the site for tool 10 to access their data, or when the consumer may load to server 20 electronic bills they may have received from their service provider.

To access the usage data, decision engine 22 may use one or more Application Program Interfaces (API's) 26 to connect to one or more billing servers 28, which may extract usage data for the customer, or consumer 12, from one or more billing databases 30. Decision engine 22 may then use the usage data from billing database 30 with the rate structure from rate/plan database 24 to prepare the listing of rate/plans and costs in the manner as described previously for usage information provided by consumer 12. When consumer 12 may upload their electronic bills to server 20, server 20 may transfer the bill to database 30, such that decision engine 22 may extract the appropriate usage information from database 30 using API 26 and server 28.

In one embodiment, the tool 10 may be hosted by a service provider. When tool 10 may be accessed by consumer 12, the listing returned by decision engine 22 may include rate/plans for the service provider hosting the tool 10. The service provider hosting the tool 10 may wish to avoid the consumer 12 choosing a rate/plan from a competing service provider. Thus, the listing may not include rate/plans for other service providers that may be competitors of the service provider hosting the tool 10. However, the rate/plan database 24 may include rate structures from other service providers. When tool 10 may be accessed by a representative of the service provider hosting the site, as at 32, the listing returned by decision engine 22 may include listings of rate/plans for all rate structures in database 24, including rate/plans of competitors. Such a listing may provide representative 32 with information that can be used to restructure the hosting service provider's rate/plans to maintain a competitive advantage over other service provider's rate/plans and/or to target certain consumers 12 in future rate/plan promotions.

The listing returned by decision engine 22 may provide the consumer 12 with an opportunity to order one of the rate/plans in the listing, such as by clicking on a rate/plan from the listing, or by clicking an icon for the desired rate/plan, or by other means as may be known to indicate a choice may be available and that a choice may have been made. When consumer 12 may select a rate/plan, decision server 20 may connect to one or more order servers 34. Pertinent information about the consumer 12, as may have been collected by decision server 20, and information on the rate/plan selected by the consumer 12 may be transferred to order server 34.

Order server 34, through decision server 20 or directly to consumer 12, may request further information from consumer 12, as may be necessary to process the order. Order server 34 may access order database 36 to process the order. When the order may be processed, consumer 12 may be notified and order server 34 may return the consumer 12 to decision server 20 to exit from tool 10, or the consumer may exit from order server 34. It can be seen from FIG. 1, and understood by those in the art, that billing server 28 and order server 34 may not need to be part of tool 10. Additionally, site server 20, as well as order server 34, may connect to internet 18 via one or more servers 38. Billing server 28 and order server 34, together with their respective databases, may be standard server modules used by a service provider that may host the tool 10, or that tool 10 may access.

Figure 2:
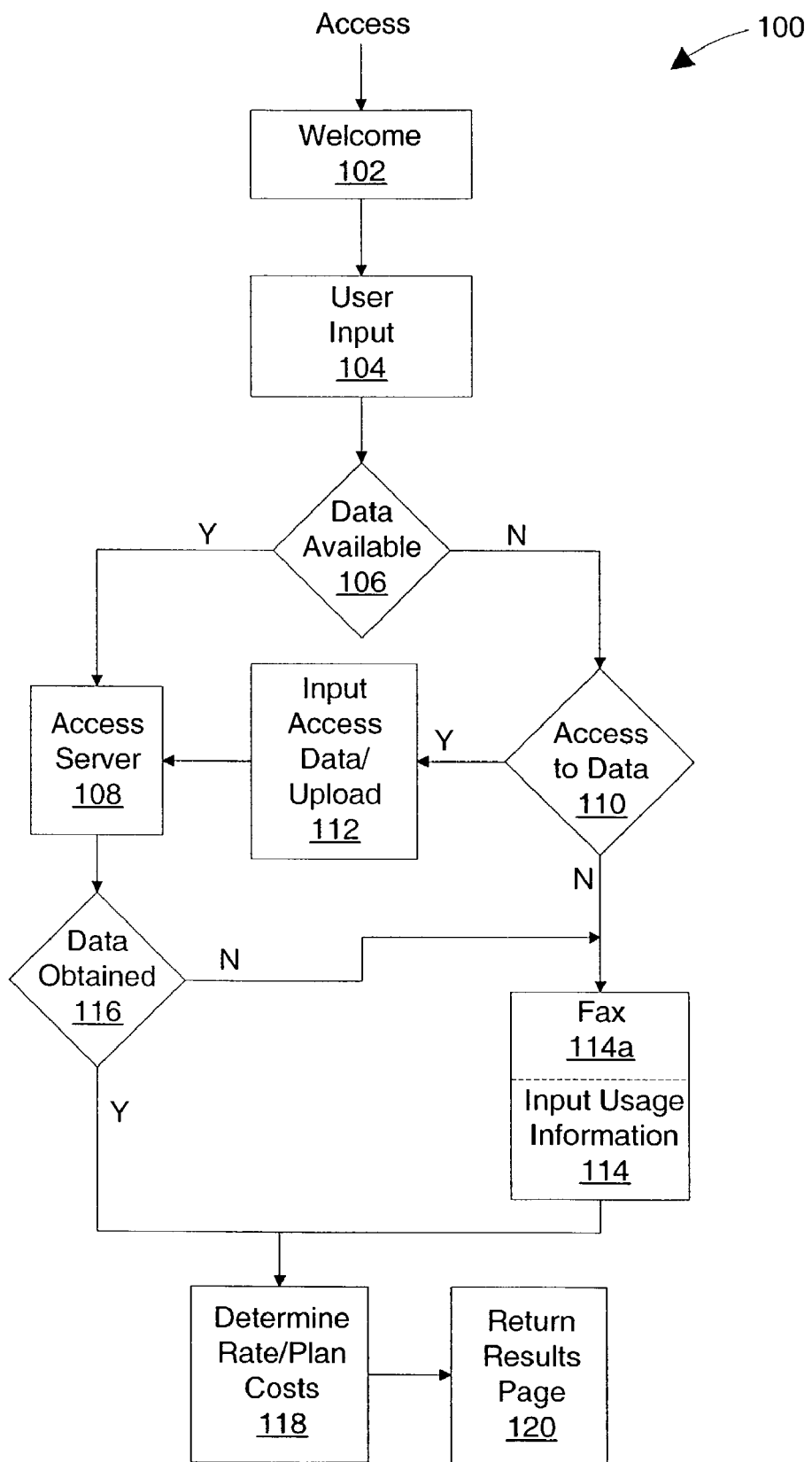
FIG. 2 shows a schematic flow chart for a rate/plan recommender method.

Referring to FIG. 2, there may be shown a flow chart for a rate/plan recommender method 100 that may be implemented by the tool, or system 10. Once access may have been gained to site server 20, the rate/plan recommender welcome page is returned to the consumer 12, or user at 102. By using a mouse or other such cursor movement device, the user may indicate, at 104, the type of service, or services desired, usage preferences for the desired service and other information about the user, service and usage that may be appropriate for the service(s) desired. For example, for a service provider hosted site, a user may indicate whether they are a current customer of the service provider, whether they are interested in a business or residential rate/plan and/or whether they wish to minimize their monthly costs or maximize their monthly calling time.

Based on the user and preference information provided at 104, method 100 can determine, at 106, whether usage data may be available for the user. Usage data may typically be available for users who are customers of the service provider hosting the site. The usage data may reside in a historical usage database, such as billing database 30, as previously described. If 106 determines usage data may be available, method 100 can access a server at 108, such as by executing API's 26 to access the customer's billing server, such as billing server 28, to obtain current and/or historical billing data from a billing database, such as billing database 30, to determine the usage pattern for the user.

Usage data may also be available for non-customers when the user may permit the host of the site to access their usage data. Thus, if 106 may determine that usage data may not be available from the user input information provided at 104, method 100 may query the user at 110 to determine if the user may permit such access and may request and obtain from the user, through user data inputs in response to prompts at 112, the necessary additional data to obtain the data. The additional data may be access data, such as codes and/or passwords, for tool 10, or method 100, to access a server at 108, such as a billing server of the user's service provider and obtain the usage data from a database containing the usage information for the user. In response to the prompts at 112, users may alternately provide the additional data by uploading into a database, such as billing database 30, an electronic version of their usage data as may be available from their service provider.

For users who may not wish to provide access and for users where usage data for the desired service may not be available, method 100 may request and obtain, at 114, usage information through user inputs in response to prompts from method 100. There may be times when usage data may reside in a database yet may not be obtained by accessing the server at 108, e.g., the server may not be operating, or the server may not recognize the access codes or passwords provided. Method 100 may also use the requests, prompts and responses at 114 when 116 may determine that data may not have been obtained by accessing the server at 108.

The usage information that may be input at 114 may be based on previous billing statements, or the like, or the user may estimate the usage information if no previous billing data may be available. In one embodiment, illustrated in phantom at 114a, the user may fax the usage information, such as may be shown on a billing statement, to a representative 32 of the service provider who may be hosting the site and the representative 32 may input the usage information at 114. For a phone service example, the user may input such usage information as total minutes called in a billing cycle, time of calls, numbers called, percentage of intra- and interstate calls, etc.

Once usage data/information may have been obtained, either at 108 or 114, method 100 may determine, at 118, the costs for the individual rate/plans in rate/plan database 24 based on the usage data/information. As previously described, decision engine 22 may be used at 118 to determine costs of the rate/plans in database 24. Method 100 may then return to the user, at 120, a results page displaying the listing of rate/plan costs, as determined at 118. As previously described with reference to FIG. 1, the listing may include only a partial listing of rate/plan costs of the rate/plans having rate structures in database 24. The user data obtained at 104 may be used in determining which rate/plan costs may be displayed.

Referring again to FIG. 1, the method 100 of FIG. 2 may be implemented by site server 20 and decision engine 22 that may include a processor $22a$, volatile memory $22b$ and non-volatile memory $22c$. Alternatively, or in addition, server 20 may include processor(s) and memory (not shown). The memory $22b$, $22c$ may store data corresponding to the web page to be displayed, user inputs and other data as may be necessary for interaction with the user in a manner known in the art for web site access. The memory $22b$, $22c$ may also include instructions that may be transferred, in the course of operation, from the non-volatile memory $22c$ to the volatile memory $22b$ and processor $22a$ for execution. The instructions may control the processor $22a$ to prepare the listing of rate/plans based on the data stored in memory $22b$, $22c$, retrieved from rate/plan database 24 and/or from billing database 30.

The system, or tool 10, and the method 100 for implementing same, may not be limited to particular software configurations or hardware, and may find applicability in many computing or processing environments. The methods and systems can be implemented in hardware or software, or a combination of hardware and software. The methods and systems can be implemented in one or more computer programs executing on one or more programmable computers that include a processor, a storage medium readable by the processor (including volatile and non-volatile memory and/or storage elements), one or more input devices, and one or more output devices. User control for the methods and systems may be provided through a user interface that may be incorporated with an Internet Service Provider user interface.

The computer programs may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the methods and systems may have been disclosed in connection with a preferred embodiment shown and described in detail, various modifications and improvements thereon will become readily apparent to those skilled in the art. Those with ordinary skill in the art will recognize that the arrangement and connectivity of the components of tool 10 and the flow diagram shown in FIG. 2 can be merely for illustrative purposes, and can be varied accordingly and components may be combined or otherwise reconfigured without departing from the scope of the disclosed methods and systems.

Accordingly, many additional changes in the details and arrangement of parts, herein described and illustrated, can be made by those skilled in the art. It will thus be understood that the following claims may not to be limited to the embodiments disclosed herein, can include practices otherwise than specifically described, and may be interpreted as broadly as allowed under the law.

What is claimed is:

1. A service provider hosted method of analyzing rate plans for communication services, comprising:
   obtaining rate structures from a plurality of sources;
   storing the rate structures in a rate plan database;
   electronically obtaining user input data from a user;
   deriving, by a computer processor, a usage pattern from usage data for a consumer of communication services by determining, based on the user input data, whether a historical usage database reflecting prior use of communication services by the consumer is available, and
      based on the determination that the historical usage database reflecting the prior use of communication services is available, selecting, by the computer processor, the usage data from the historical usage database, and
      based on the determination that the historical usage database reflecting the prior use of communication services is not available, obtaining additional input data from the user and determining the usage data based on the additional input data;
   determining, by the computer processor, a set of proposed rate plans for the consumer based on the usage pattern;
   determining a type of the user;
   based on the determination that the user is a consumer type, filtering out from the set of proposed rate plans, by the computer processor, a rate plan from a competitor of the service provider, and presenting the filtered proposed rate plans to the user; and
   based on the determination that the user is a representative of the service provider, presenting the set of proposed rate plans without filtering out a rate plan from a competitor of the service provider.

2. The method of claim 1, wherein obtaining additional input data from the user and determining the usage data based on the additional input data further comprises:
   obtaining access data from the user to access a usage database, and
   selecting the usage data from the usage database using the access data.

3. The method of claim 2, wherein selecting the usage data from either the historical usage database or the usage database further comprises:
   accessing a first server to execute at least one application program interface to communicate with a second server for selecting the usage data from the database.

4. The method of claim 1, wherein determining the usage data based on the additional input data further comprises:
   determining, based on the additional input data, whether the usage data is available from the user; and
   based on the determination that the usage data is available from the user, obtaining the usage data from the user.

5. The method of claim 4, wherein obtaining the usage data from the user further comprises at least one of:
   enabling the user to upload an electronic version of the usage data;
   enabling the user to submit estimates of the usage data as user inputs; and
   enabling the user to transmit the usage data as a facsimile transmission.

6. The method of claim 1, further comprising:
   enabling the user to order the filtered proposed rate plan; and
   transmitting information from the obtained user input data and the selected usage data to an order processor to process the information as an order.

7. A computer-readable storage medium containing instructions for executing, by operation of a processor, a service provider hosted method of analyzing rate plans for communication services, the method comprising:
   obtaining rate structures from a plurality of sources;
   storing the rate structures in a rate plan database;
   electronically obtaining user input data from a user;
   deriving a usage pattern from usage data for a consumer of communication services by determining, based on the user input data, whether a historical usage database reflecting prior use of communication services by the consumer of communication services is available, and
      based on the determination that the historical usage database reflecting the prior use of communication services is available, selecting the usage data from the historical usage database, and
      based on the determination that the historical usage database reflecting the prior use of communication services is not available,
         obtaining access data from the user to access a usage database and selecting the usage data from the usage database, and
         obtaining additional input data from the user to determine whether the usage data is available from the user, and based on the determination that the usage data is available from the user, obtaining the usage data from the user; and
   determining a set of proposed rate plans for the consumer based on the usage pattern;
   determining a type of the user;
   based on the determination that the user is a consumer type, filtering out from the set of proposed rate plans, a rate plan from a competitor of the service provider, and presenting the filtered proposed rate plans to the user; and
   based on the determination that the user is a representative of the service provider, presenting the set of proposed rate plans without filtering out a rate plan from a competitor of the service provider.

8. The computer-readable storage medium of claim 7, wherein obtaining the usage data from the user further comprises at least one of:
   enabling the user to upload an electronic version of the usage data;
   enabling the user to submit estimates of the usage data as user inputs; and
   enabling the user to transmit the usage data as a facsimile transmission.

9. The computer-readable storage medium of claim 7, wherein selecting the usage data from either the historical usage database or the usage database further comprises:
   accessing a first server to execute at least one application program interface to communicate with a database server to access one of the historical usage database and the usage database.

10. The computer-readable storage medium of claim 7, the service provider hosted method further comprising:
    enabling the user to order the proposed rate plan; and
    transmitting information from the obtained user input data and the selected usage data to an order processor to process the information as an order.

11. A service provider hosted system for analyzing rate plans for communication services, comprising:
    a web-based site server;
    a rate plan database storing rate structures for the rate plans; and
    a processor configured to connect to the web-based site server and the rate plan database for:

electronically obtaining user input data from a user;

deriving a usage pattern from usage data for a consumer of communication services;

determining a set of proposed rate plans for the consumer based on the usage pattern;

determining a type of the user;

based on the determination that the user is a consumer type, filtering out from the set of proposed rate plans, a rate plan from a competitor of the service provider, and presenting the filtered proposed rate plans to the user; and based on the determination that the user is a representative of the service provider, presenting the set of proposed rate plans without filtering out a rate plan from a competitor of the service provider.

12. The system of claim 11, further comprising:

at least one application program interface to facilitate communication between the processor and at least one database server for obtaining the usage data from the usage database.

13. The system of claim 11, wherein the web-based site server enables the user to order the proposed rate plan, and the processor is further configured to transmit information from the obtained usage data to an order processor to process the information as an order.

* * * * *